US012630295B2

(12) United States Patent
Bertrand

(10) Patent No.: US 12,630,295 B2
(45) Date of Patent: May 19, 2026

(54) AIRCRAFT POWER PLANT WITH ELECTRIC MOTOR POWERED BY FUEL CELL

(71) Applicant: PRATT & WHITNEY CANADA CORP., Longueuil (CA)

(72) Inventor: Pierre Bertrand, Longueuil (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/392,973

(22) Filed: Dec. 21, 2023

(65) Prior Publication Data

US 2025/0206449 A1 Jun. 26, 2025

(51) Int. Cl.
| | |
|---|---|
| *B64D 27/33* | (2024.01) |
| *B64D 27/10* | (2006.01) |
| *B64D 27/355* | (2024.01) |
| *B64D 37/30* | (2006.01) |

(52) U.S. Cl.
CPC ............. *B64D 27/33* (2024.01); *B64D 27/10* (2013.01); *B64D 27/355* (2024.01); *B64D 37/30* (2013.01)

(58) Field of Classification Search
CPC ...... B64D 27/33; B64D 27/355; B64D 27/24; B64D 27/30; B64D 27/10; B60L 50/72; B60L 2200/10
See application file for complete search history.

(56) References Cited

U.S. PATENT DOCUMENTS

| | | | |
|---|---|---|---|
| 7,986,052 B2 | 7/2011 | Marconi | |
| 10,978,723 B2 | 4/2021 | Lo et al. | |
| 11,718,410 B2 | 8/2023 | Clarke et al. | |
| 11,724,815 B2 | 8/2023 | Mackin et al. | |
| 12,162,611 B2 * | 12/2024 | Butler | F02C 6/00 |
| 2015/0013306 A1 | 1/2015 | Shelley | |
| 2022/0297844 A1 * | 9/2022 | Mackin | B64D 41/00 |
| 2023/0039759 A1 | 2/2023 | Wang et al. | |
| 2023/0120297 A1 * | 4/2023 | Butler | B64D 27/10 |
| | | | 290/52 |
| 2023/0212988 A1 | 7/2023 | Wang et al. | |
| 2024/0166356 A1 * | 5/2024 | Da Silva Collares | B64D 13/06 |

OTHER PUBLICATIONS

European Patent Office, Communication re. extended European search report for European patent application No. 24221292.6, Apr. 28, 2025.

* cited by examiner

*Primary Examiner* — Philip J Bonzell
(74) *Attorney, Agent, or Firm* — Norton Rose Fulbright Canada LLP

(57) ABSTRACT

An aircraft power plant, has: an air mover for propelling an aircraft; an electric motor drivingly engaged with the air mover; a gas turbine engine having a compressor for pressurizing air, a combustor in which the pressurised air is mixed with fuel and ignited for generating combustion gases, and a turbine for extracting energy from the combustion gases; and a hydrogen fuel cell operatively connected to the electric motor for powering the electric motor with electricity generated by the hydrogen fuel cell, the hydrogen fuel cell operable to generate electricity using the air from the compressor and hydrogen from a source of hydrogen.

17 Claims, 6 Drawing Sheets

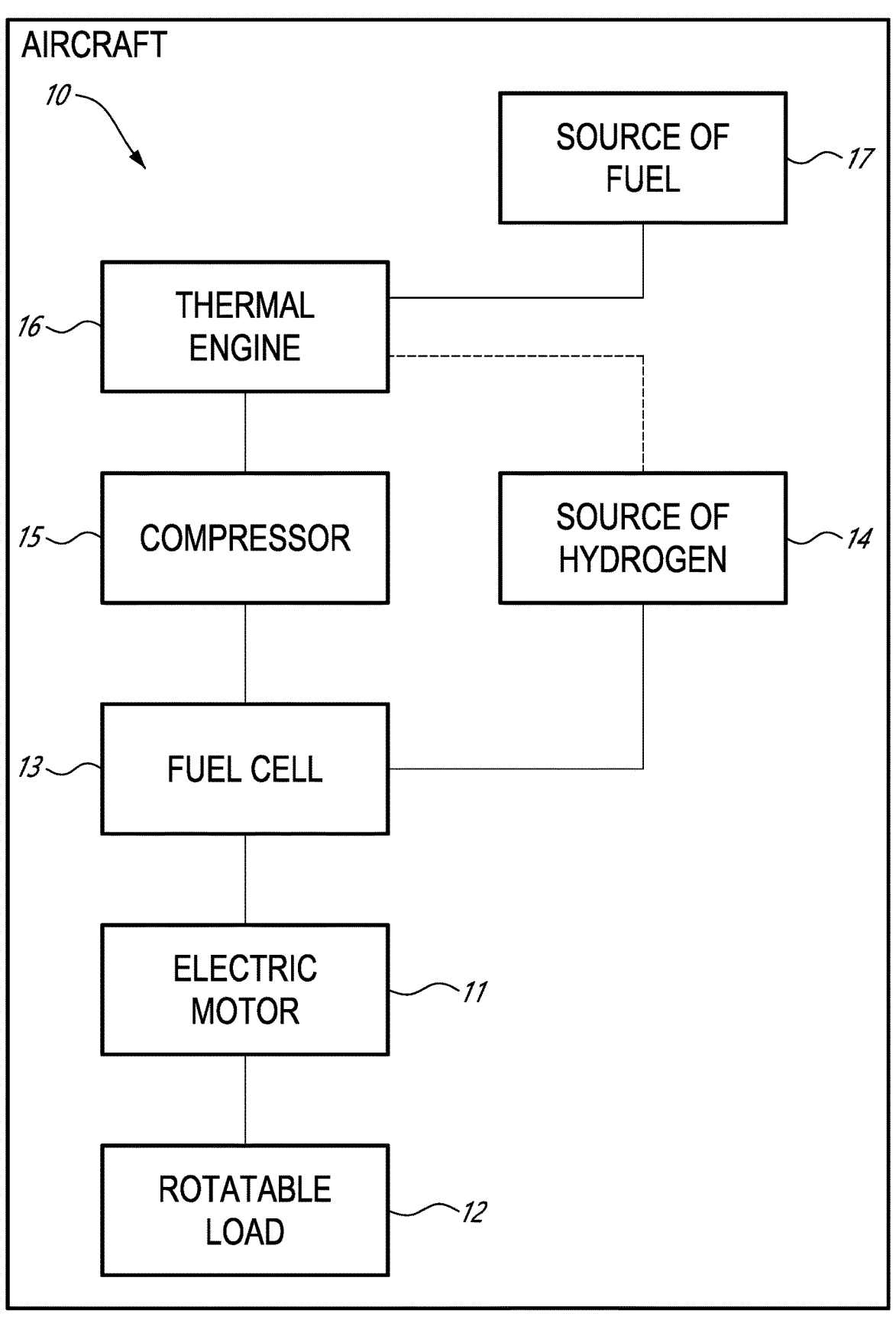
_Fig. 1_

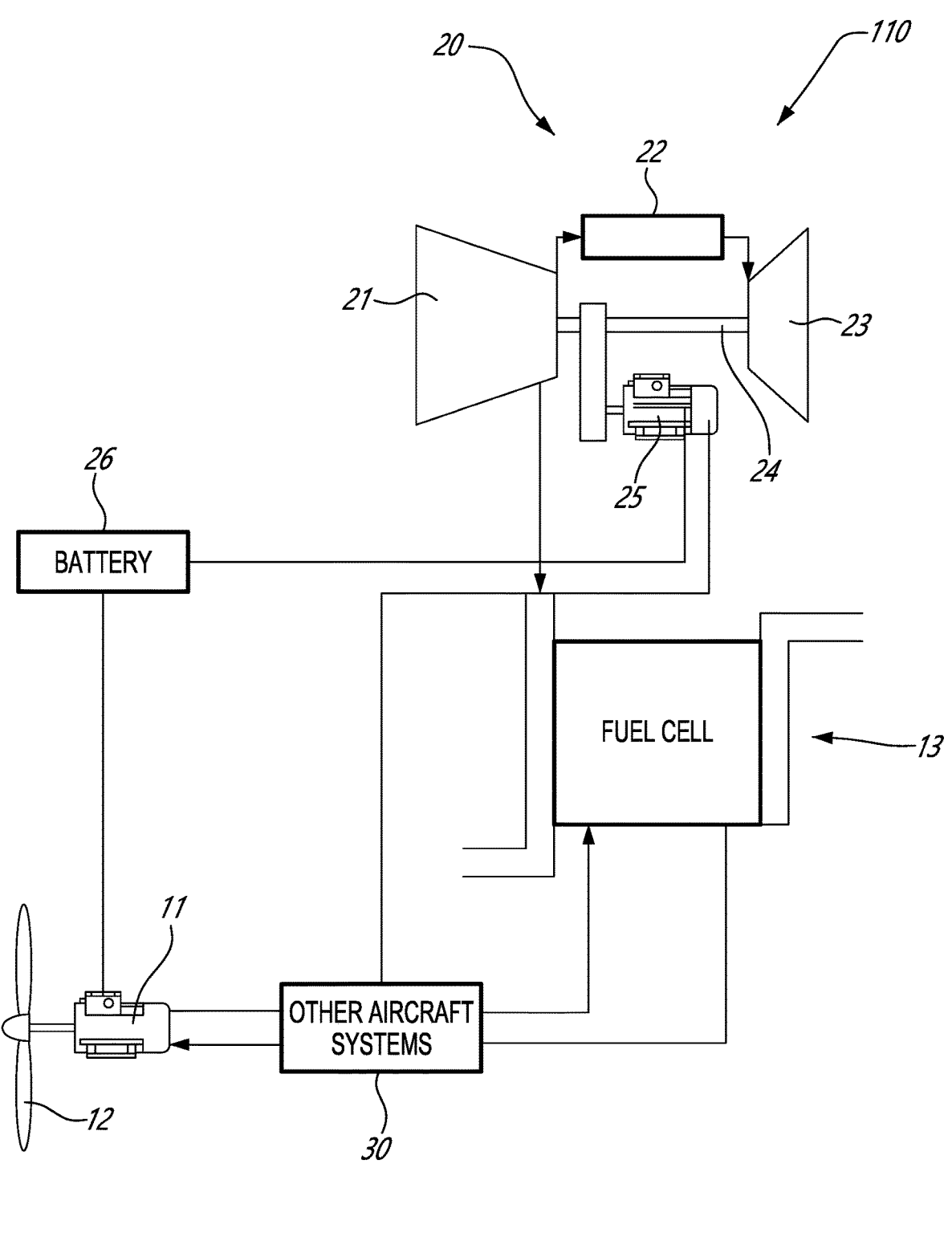
_FIG. 2_

AIRCRAFT POWER PLANT WITH ELECTRIC MOTOR POWERED BY FUEL CELL

TECHNICAL FIELD

The application relates generally to aircraft power plants and, more particularly, to aircraft power plants including fuel cells.

BACKGROUND

Aircraft engines that burn fossil fuels generate emissions. Some hybrid aircraft power plants that include a thermal engine and an electric motor for propelling aircraft can provide operational advantages. However, hybrid aircraft power plants can require relatively heavy batteries. Improvements are therefore sought.

SUMMARY

In one aspect, there is provided an aircraft power plant, comprising: an air mover for propelling an aircraft; an electric motor drivingly engaged with the air mover; a gas turbine engine having a compressor for pressurizing air, a combustor in which the pressurised air is mixed with fuel and ignited for generating combustion gases, and a turbine for extracting energy from the combustion gases; and a hydrogen fuel cell operatively connected to the electric motor for powering the electric motor with electricity generated by the hydrogen fuel cell, the hydrogen fuel cell operable to generate electricity using the air from the compressor and hydrogen from a source of hydrogen.

The aircraft power plant described above may include any of the following features, in any combinations.

In some embodiments, the combustor is fluidly connected to the source of hydrogen, the hydrogen fuel cell and the gas turbine engine both supplied with the hydrogen from the source of hydrogen.

In some embodiments, a conduit is conveying water from the hydrogen fuel cell to the compressor of the gas turbine engine.

In some embodiments, a conduit is conveying water from the hydrogen fuel cell to the combustor of the gas turbine engine.

In some embodiments, one or more of a heat exchanger is facilitating heat removal from the fuel cell, an evaporator facilitating evaporation of liquid water exiting the fuel cell, and a condenser facilitating condensation of gaseous water exiting the fuel cell.

In some embodiments, the heat exchanger facilitates heat transfer from the fuel cell to ambient air; the aircraft power plant includes an ejector driving ambient air through the heat exchanger; and the ejector is driven using combustion gas exhausted from the gas turbine engine.

In some embodiments, the gas turbine engine has a starter/generator drivingly engaged to the turbine, the starter/generator being operable as a motor and as generator.

In some embodiments, the starter/generator corresponds to the electric motor.

In some embodiments, the air mover is devoid of mechanical engagement with the gas turbine engine.

In another aspect, there is provided a method of driving an air mover for propelling an aircraft, the method comprising: operating a gas turbine engine; conveying compressed air extracted from the gas turbine engine to a hydrogen fuel cell; generating electricity with the hydrogen fuel cell using oxygen from the compressed air and hydrogen from a source of hydrogen onboard the aircraft; and supplying the electricity generated by the fuel cell to an electric motor drivingly engaged with the air mover.

The method described above may include any of the following features, in any combinations.

In some embodiments, operating the gas turbine engine includes generating thrust with the gas turbine engine, the thrust being less than a thrust generated by the air mover.

In some embodiments, operating the gas turbine engine includes supplying a combustor of the gas turbine engine with the hydrogen from the source of hydrogen onboard the aircraft.

In some embodiments, the generating of the electricity includes exhausting water from the fuel cell, the method further comprising injecting the water in the gas turbine engine.

In some embodiments, the injecting of the water in the gas turbine engine includes one or more of injecting the water at an inlet of a compressor of the gas turbine engine, downstream of the inlet and upstream of an outlet of the compressor, and in a combustor of the gas turbine engine downstream of the compressor.

In some embodiments, the method includes transferring heat generated by the fuel cell to a working fluid, and transferring the heat from the working fluid to ambient air.

In some embodiments, the transferring of the heat to the working fluid includes transferring the heat to air flowing within a conduit.

In some embodiments, the method includes driving an air flow within the conduit with exhaust gas exhausted by the gas turbine engine and flowing through an ejector located within the conduit.

In some embodiments, the method includes: starting the gas turbine engine using a starter/generator connected to the gas turbine engine; and after the starting the gas turbine engine, generating electricity with the starter/generator driven by the gas turbine engine.

In some embodiments, the air mover is devoid of mechanical engagement with the gas turbine engine.

In yet another aspect, there is provided an aircraft power plant, comprising: an electric motor drivingly engaged with a load; a gas turbine engine; and a hydrogen fuel cell operatively connected to the electric motor for powering the electric motor with electricity generated by the fuel cell, the fuel cell operable to generate the electricity using compressed air extracted from the gas turbine engine and hydrogen from a source of hydrogen.

BRIEF DESCRIPTION OF THE DRAWINGS

Reference is now made to the accompanying figures in which:

FIG. 1 is a schematic view of an aircraft power plant in accordance with one embodiment;

FIG. 2 is a schematic view of an aircraft power plant in accordance with another embodiment;

DETAILED DESCRIPTION

Figure 3:
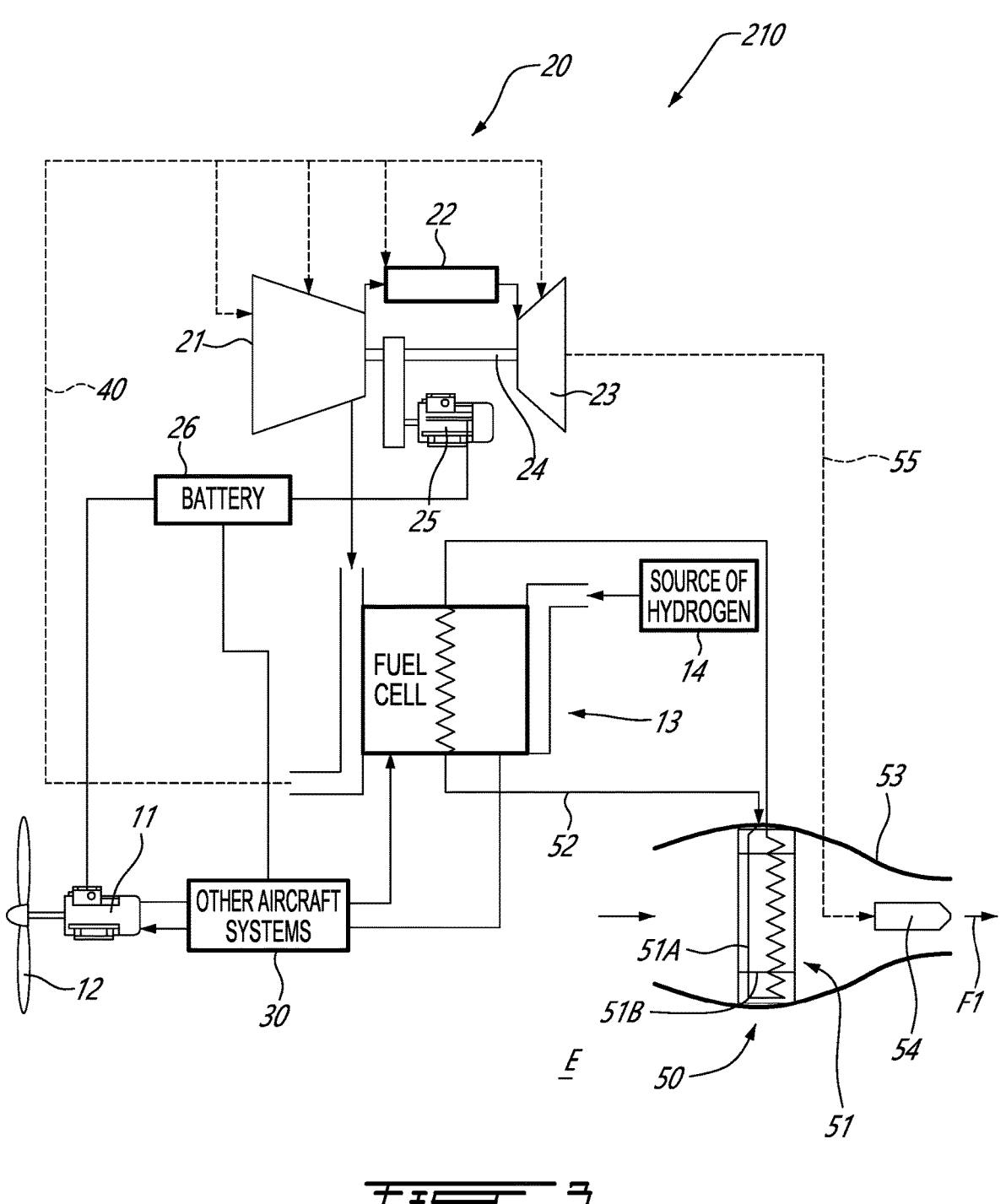
FIG. 3 is a schematic view of an aircraft power plant in accordance with yet another embodiment.

This present disclosure aims at improving aircraft power plants. In some embodiments, the aircraft power plants described herein include a gas turbine engine cooperating with a hydrogen fuel cell to power an electric motor drivingly coupled to an air mover configured to propel an aircraft. In some configurations, a portion of electricity generated by the fuel cell is used to run one or more peripheral systems of the aircraft. In some embodiments, the aircraft power plant uses a gas turbine engine to supply compressed air to a fuel cell, which then generates electricity from this compressed air and from hydrogen. The electricity generated by the fuel cell is used to power an electric motor that drives an air mover for propelling the aircraft. Some embodiments of the disclosed aircraft power plants may reduce parasitic losses since it may not be required to use a portion of the electricity generated by the fuel cell to power a compressor used for compressing the air supplied to the fuel cell.

Referring to FIG. 1, there is provided an aircraft power plant for an aircraft for at least partially alleviating these drawbacks. The aircraft power plant is shown at 10 and includes an electric motor 11 drivingly engaged to a rotatable load 12, which may be an air mover. The rotatable load 12 may be a propeller for instance. Any other suitable air mover may be used such as a fan or other bladed rotor. In the context of the present disclosure, the rotatable load 12 is used for propelling the aircraft. The rotatable load 12 is therefore configured to accelerate a flow of air to create a thrust for propelling an aircraft. In some embodiments, the load may be, for instance, a generator, a pump, or another system driven by an auxiliary power unit (APU) for example.

In the present embodiment, the electric motor 11 is powered by a fuel cell 13. A fuel cell is an electrochemical cell that converts chemical energy of a fuel, for instance hydrogen, and an oxidizing agent, such as oxygen, into electricity. Fuel cell 13 may require a continuous source of fuel and oxygen to sustain the chemical reaction and hence the generation of electricity. Fuel cell 13 may be configured to produce electricity continuously for as long as fuel and oxygen are supplied. A fuel cell typically includes an anode, a cathode, and an electrolyte disposed therebetween. The electrolyte may be located within a proton exchange membrane between the anode and the cathode. The electrolyte is configured to allow ions, often positively charged hydrogen ions (protons) to move between the anode and the cathode. At the anode, a catalyst causes the fuel to undergo oxidation reactions that generate hydrogen ions and electrons. The ions move from the anode to the cathode through the electrolyte. At the same time, electrons flow from the anode to the cathode through an external circuit, producing direct current electricity. At the cathode, another catalyst causes ions, electrons, and oxygen to react, forming water, either in liquid or gaseous phase, and possibly other products.

The fuel cell 13, which is herein a hydrogen fuel cell, is operatively connected to the electric motor 11 and configure for supplying the electric motor 11 with electricity. The fuel cell 13 is fluidly connected to a source of hydrogen 14 and receives hydrogen therefrom. The fuel cell 13 requires oxygen to ensure proper chemical reaction within the fuel cell 13. For ground operated vehicles, ambient air may be simply conveyed through the fuel cell 13 to proceed with the chemical reaction that generates the electricity. However, for aircraft applications, when the aircraft flies at high altitude, a density of the air becomes very low. It may be beneficial to compress the air prior to feeding said air to the fuel cell 13.

In the present embodiment, a compressor 15 is used for compressing the air and for feeding the pressurized air to the fuel cell 13. The compressor 15 is therefore fluidly connected to the fuel cell 13. In this case, the compressor 15 is driven by a thermal engine 16. The thermal engine 16 may be, for instance, an internal combustion engine, such as a piston engine or a rotary engine. Any suitable internal combustion engine having at least one combustion chamber of varying volume may be used without departing from the scope of the present disclosure. The thermal engine 16 is drivingly engaged to the compressor 15 and operation of the thermal engine 16 drives the compressor 15 for generating the compressed air that is then conveyed through the fuel cell 13. Alternatively, compressor 15 may be part of a gas turbine engine as explained below. The thermal engine 16 may be supplied with fuel from a source of fuel 17, such as heavy fuel or any other suitable fuel. In some cases, the thermal engine 16 may be fed with hydrogen from the source of hydrogen 14. Hence, both of the thermal engine 16 and the fuel cell 13 may run off hydrogen. Only a single hydrogen reservoir may be used or, alternatively two reservoirs may be used to respectively feed the thermal engine 16 and the fuel cell 13.

Referring now to FIG. 2, another embodiment of an aircraft power plant is shown as 110. The aircraft power plant 110 includes a gas turbine engine 20 that is used for providing compressed air to the fuel cell 13. The gas turbine engine 20 includes a compressor 21 for pressurizing the air, a combustor 22 in fluid flow communication with the compressor 21 and located downstream of the compressor 21 relative to flow through a gas path of the gas turbine engine 20, and a turbine 23 in fluid flow communication with the combustor 22 and located downstream of the combustor 22 relative to the flow and configured for extracting energy from combustion gases exiting the combustor 22. The turbine 23 is drivingly engaged to the compressor 21 via a shaft 24. In the gas turbine engine 20, air flows into the compressor 21 where it is pressurized. The pressurized air is then mixed with fuel in the combustor 22 to generate a stream of hot combustion gas. Energy of the combustion gas is at least partially extracted by the turbine 23, which drives rotation of the compressor 21 via the shaft 24. The combustor 22 may be supplied with hydrogen for combustion. Alternatively, another suitable aviation fuel may be burned in combustor 22 of the gas turbine engine 20.

It will be appreciated that an aircraft may be equipped with one or more electric motors 11 and respective air movers. The electric motors 11 may be all supplied with electricity from a single pack of one or more fuel cells, which may be supplied with compressed air via a single thermal engine (e.g., gas turbine engine 20). Alternatively, each of the electric motors 11 may be coupled with a respective fuel cell, which is supplied with compressed air via a dedicated thermal engine and compressor. Any configurations and any number of electric motors 11, fuel cell(s), battery 26, thermal engines (e.g., gas turbine engines 20) is contemplated.

In the depicted configuration, it will be appreciated that the gas turbine engine 20 may generate a thrust for propelling the aircraft. However, in some embodiments a thrust generated by the air mover 12 may be greater than a thrust generated by the gas turbine engine 20. In some embodiments, the gas turbine engine 20 and optionally other part(s) of power plant 110 may be located, for instance, within an tail section of an aircraft and used mainly for supplying pneumatic and electrical power to the aircraft. In some embodiments, power plant 110 may therefore be an auxiliary power unit (APU) whose primary function is not propulsion of the aircraft.

Still referring to FIG. 2, the gas turbine engine 20 may be further equipped with a starter/generator 25, which may be drivingly engaged to the shaft 24. In the embodiment shown, the starter/generator 25 and the electric motor 11 are two distinct motors separate from one another. Suitable gearing may be used to couple the starter/generator 25 to the shaft 24. The starter/generator 25 may be operatively connected to a battery 26 able to provide power or to receive power from the starter/generator 25. The starter/generator 25 may have two modes: a starter mode in which electricity is supplied to the starter/generator 25 from the battery 26 and in which the starter/generator 25 generates a torque for rotating the shaft 24 of the gas turbine engine 20 for starting the gas turbine engine 20; and a generator mode in which the shaft 24 of the gas turbine engine 20 drives the starter/generator 25 for generating electricity. The battery 26 may be used for starting the gas turbine engine 20 by supplying electricity to starter/generator 25 that initiates the rotation of the different components of the gas turbine engine 20. Once the gas turbine engine 20 is started, the starter/generator 25 may be used to generate electricity that supplies other aircraft systems 30 of the aircraft equipped with the aircraft power plant 110. In some embodiments, other aircraft systems 30 may be provided with electricity generated by the fuel cell 13. These other systems 30 may be for instance, de-icing systems, environmental control systems, lighting in a passenger cabin of the aircraft, avionics, and so on.

In some configurations, the starter/generator 25 may be used to supply electricity to the electric motor 11 that drives the air mover 12. Fuel cell are typically heavy and takeoff power is usually the parameter used for sizing the fuel cell. If less takeoff power is required, fuel cell size may be reduced thereby saving weight. At take-off, at least a portion of the electrical power supplied to the electric motor 11 comes from the starter/generator 25, either directly or from the battery 26. Hence, the size of the fuel cell 13 may be determined based on the required power during cruise, rather than at take-off . . . . Heat exchange system 50 (shown in FIG. 3) may be sized to accommodate heat generated by the fuel cell 13 during cruise, rather than during take-off. This may further provide weight savings. The thrust generated by the gas turbine engine 20 may also contribute in propelling the aircraft, although to a less extend than the air mover 12.

The purpose of the gas turbine engine 20 may be primarily for the generation of compressed air for the operation of fuel cell 13. The air mover 12 may therefore be devoid of any mechanical engagement with the gas turbine engine 20. Put differently, the gas turbine engine 20 may not contribute in mechanically driving the air mover 12.

Referring now to FIG. 3, another embodiment of an aircraft power plant is shown at 210. For the sake of conciseness, only features differing from the aircraft power plant 110 described above with reference to FIG. 2 will be described below.

The aircraft power plant 210 of this configuration includes features that may help increase an efficiency thereof. In the embodiment, a conduit 40 is fluidly connected to a water/steam outlet of the fuel cell 13 and is fluidly connected to the gas turbine engine 20. The water/steam generated by the fuel cell 13 may be injected in the gas turbine engine 20 at one or more locations to increase an efficiency of the gas turbine engine 20. In some embodiments, injecting water as disclosed improves efficiency of the gas turbine engine via intercooling processes. Also, the injecting of the steam in the combustor may reduce NOx generation and may increase cycle efficiency by providing an increased amount of working fluid supplied to the turbine. The water/steam injection may reduce emissions of nitrogen oxides (NOx). The conduit 40 may have its outlet fluidly connected at one or more of the following locations on the gas turbine engine 20: at an inlet of the compressor 21; downstream of the inlet of the compressor 21 and upstream of an outlet of the compressor 21; between the compressor 21 and the combustor 22, for instance at the inlet of the combustor 22; and to the turbine 23 downstream of the combustor 22.

Still referring to FIG. 3, in the embodiment shown, the aircraft power plant 210 has a heat exchange system 50. The heat exchange system 50 includes a heat exchanger 51 configured for transferring heat extracted from the fuel cell 13 to an environment E outside the aircraft power plant 210. The heat exchanger 51 includes at least one first conduit 51A and at least one second conduit 51B. The at least one first conduit 51A is in heat exchange relationship with the at least one second conduit 51B. The at least one first conduit 51A is fluidly connected to a coolant conduit 52 that extends through the fuel cell 13 and is configured to flow a coolant, such as a liquid coolant, such as water, a solution of glycol and water, and any other suitable liquid coolant, to pick up heat generated by the fuel cell 13 during use. The heat exchanger 51 is therefore configured to facilitate heat removal from the fuel cell 13. The at least one second conduit 51B of the heat exchanger 51 is in fluid flow communication with air of the environment E outside the aircraft power plant 210.

In the present configuration, the heat exchanger 51 is provided across an air conduit 53 such that the air that flows through the air conduit 53 flows through the heat exchanger 51 via the at least one second conduit 51B. Hence, heat-carrying coolant extracted from the fuel cell 13 and conveyed to the at least one first conduit 51A of the heat exchanger 51 via the coolant conduit 52 is transferred to the air flowing through the air conduit 53 via the heat exchanger 51. To increase a mass flow rate of the air through the air conduit 53, an ejector 54 may be provided inside the air conduit 53 to drive the air through the air conduit 53. The ejector 54 may be located downstream of the heat exchanger 51 relative to an air flow F1 in the air conduit 53. The ejector 54 may be in fluid communication with an exhaust of the gas turbine engine 20 via an exhaust conduit 55. Thus, combustion gas exiting the turbine 23 of the gas turbine engine 20 flows within the exhaust conduit 55 and is injected in the air conduit 53 via the ejector 54. The ejector 54 therefore contributes in driving air through the air conduit 53 via entrainment caused by the exhaust gas. It would be appreciated that, in some configurations, the ejector 54 may be omitted. Similarly, the heat exchanger 51 need not be located within the air conduit with 53 and may instead provide heat exchange relationship between the coolant and another fluid. In this configuration, the heat exchange system 50 may be devoid of a cooling fan.

Figure 4:
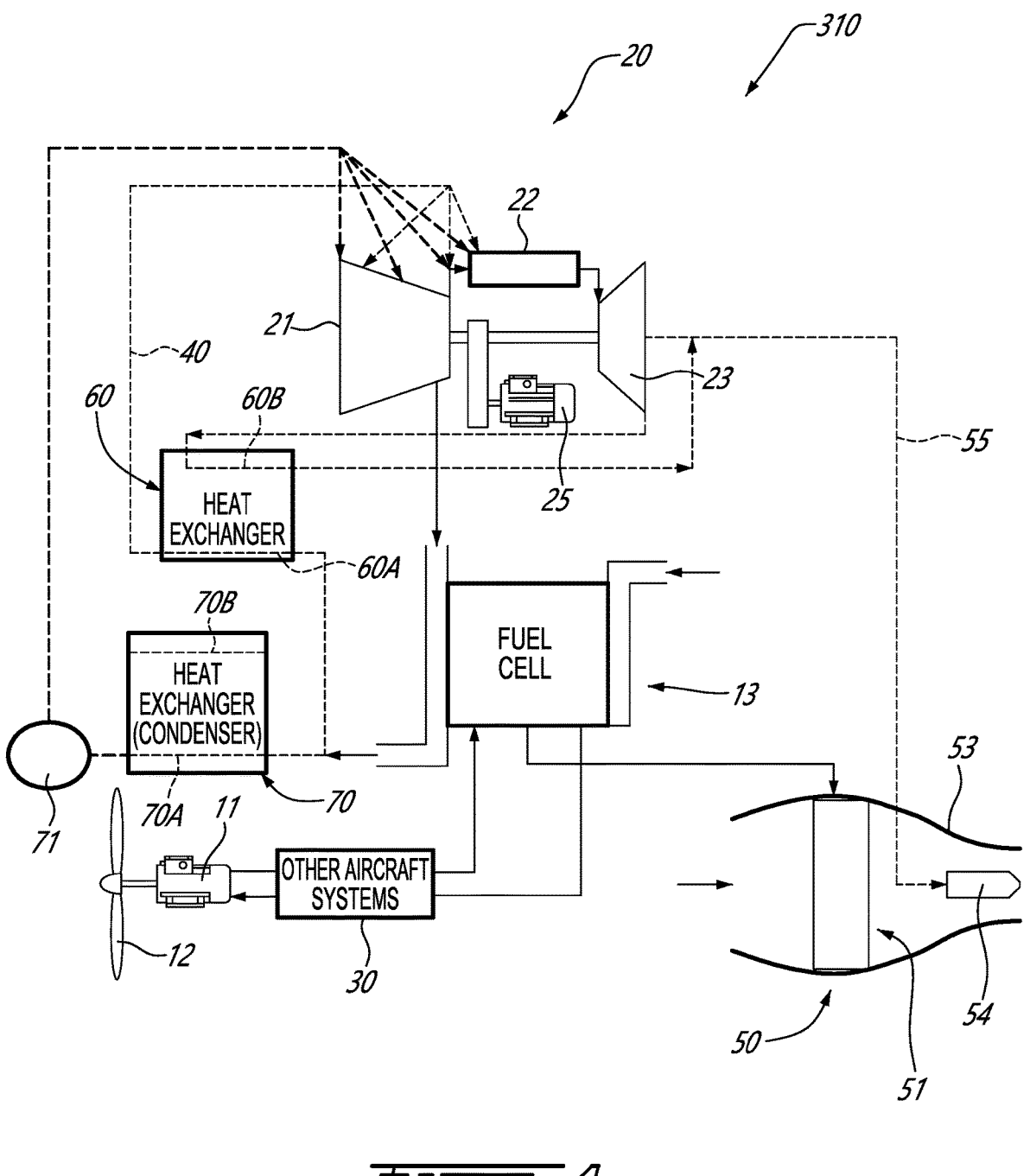
FIG. 4 is a schematic view of an aircraft power plant in accordance with yet another embodiment.

Referring now to FIG. 4, another embodiment of an aircraft power plant is shown at 310. For the sake of conciseness, only features differing from the aircraft power plant 210 described above with reference to FIG. 3 will be described below. Some of the components of the aircraft power plant 210 of FIG. 3 may also be present in the aircraft power plant 310 of FIG. 4, but are omitted in FIG. 4 for clarity reasons.

Depending on the temperature of operation of the fuel cell 13, the reaction products coming out of the fuel cell 13 may include, water in liquid phase, water in gaseous phase, or a combination of liquid water and gaseous water (i.e., steam). Thus, the aircraft power plant 310 may include a secondary heat exchanger 60, which may be referred to as an evaporator for facilitating heat exchange between the water and/or steam exiting the fuel cell 13 and combustion gases exiting the turbine 23 of the gas turbine engine 20. More specifically, the secondary heat exchanger 60 includes at least one first conduit 60A in fluid flow communication with an outlet of the fuel cell 13 and at least one second conduit 60B in fluid flow communication with an outlet of the turbine 23 of the gas turbine engine 20. The at least one first conduit 60A is in heat exchange relationship with the at least one second conduit 60B. The secondary heat exchanger 60 may thus increase a temperature of the water and/or steam exiting the fuel cell 13 such as to evaporate at least a portion or all of the water outputted by the fuel cell 13 into steam before injecting said steam into the gas turbine engine 20 as described herein above with reference to FIG. 3. The secondary heat exchanger 60 may include any other heat source different than the combustion gases exiting the turbine 23 of the gas turbine engine 20.

In some embodiments, the aircraft power plant 310 may include a tertiary heat exchanger 70, which may be referred to as a condenser for facilitating heat exchange between the water and/or steam exiting the fuel cell 13 and another fluid being at a colder temperature. The tertiary heat exchanger 70 includes at least one first conduit 70A in fluid flow communication with an outlet of the fuel cell 13 for receiving the water and/or steam outputted by the fuel cell 13 and at leas tone second conduit 70B in fluid communication with a source of the other fluid. The at least one first conduit 70A is in heat exchange relationship with the at least one second conduit 70B. The tertiary heat exchanger 70 may thus decrease a temperature of the water and/or steam exiting the fuel cell 13 such as to condense at least a portion or all of the steam outputted by the fuel cell 13 into water before injecting said water into the gas turbine engine 20 as described herein above with reference to FIG. 3. A pump 71 may be used to drive a flow of the water out of the tertiary heat exchanger 70. The other fluid may be, for instance, ambient air of the environment E outside the aircraft power plant 310. Any other fluid being at a colder temperature than the water and/or steam exiting the fuel cell 13 may be used. For instance, the other fluid may be fuel of a fuel cooling circuit of the air craft power plant 310.

Water and/or steam can be used at several locations in the cycle to improve power and/or efficiency as described above. This source of water and/or steam may also be used in the combustor 22. This may reduce NOx formation.

Figure 5:
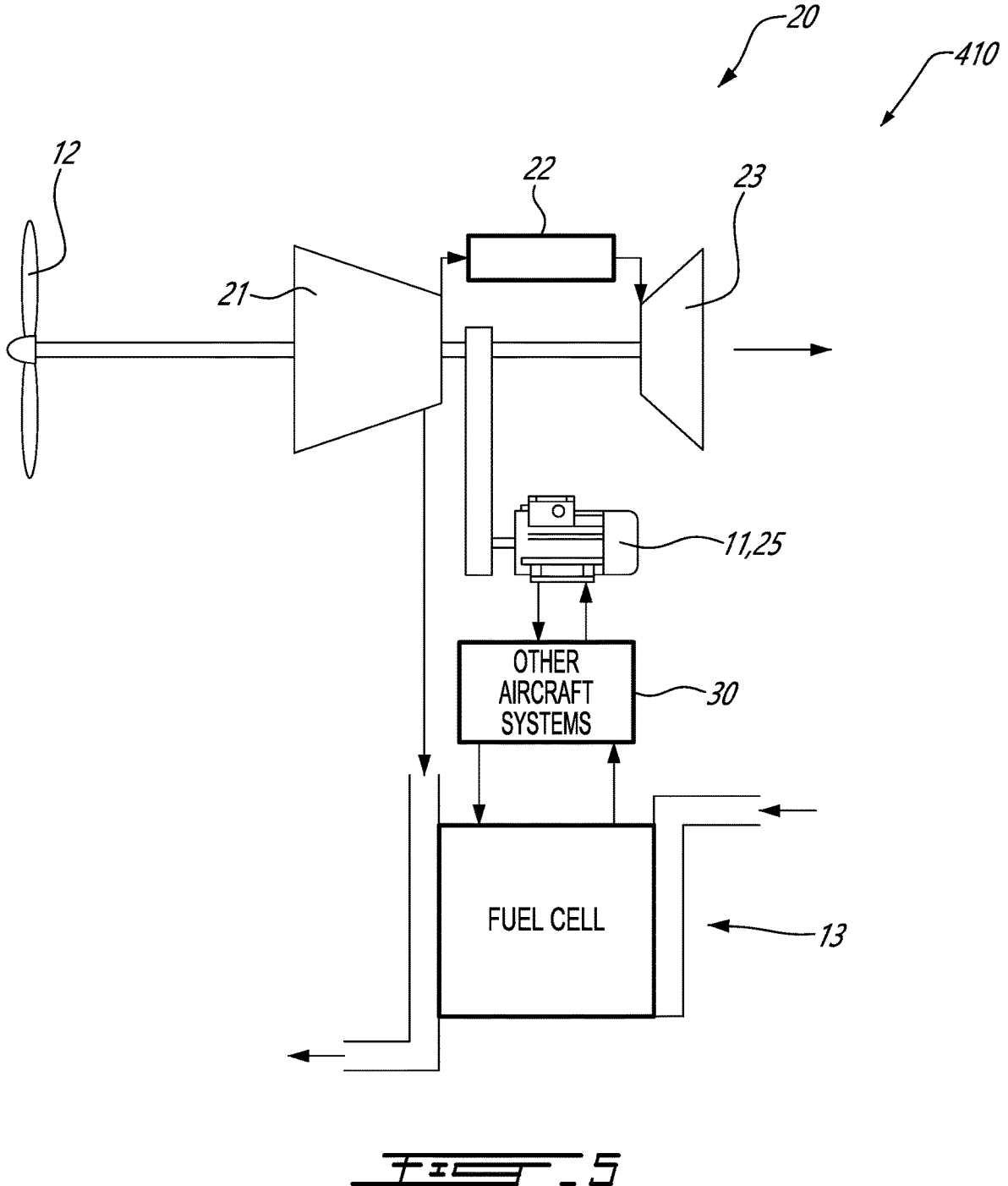
FIG. 5 is a schematic view of an aircraft power plant in accordance with yet another embodiment.

Referring now to FIG. 5, another embodiment of an aircraft power plant is shown at 410. Some of the components of the aircraft power plant 210, 310 of FIGS. 3-4 may also be present in the aircraft power plant 410 of FIG. 5, but are omitted in FIG. 4 for clarity reasons.

In the embodiment shown, the gas turbine engine 20 is drivingly engaged to the air mover 12 via a shaft. The fuel cell 13 generates electricity used to power an electric motor 25, which also acts as the starter/generator 11. Hence, in this embodiment, the electric motor 11 corresponds to the starter/ generator 25. The electric motor 25 is therefore drivingly engaged to the air mover 12 through a shaft of the gas turbine engine 20. A portion of the compressed air generated by the compressor 21 is bled from the compressor 21 to feed the fuel cell 13 as discussed above.

Figure 6:
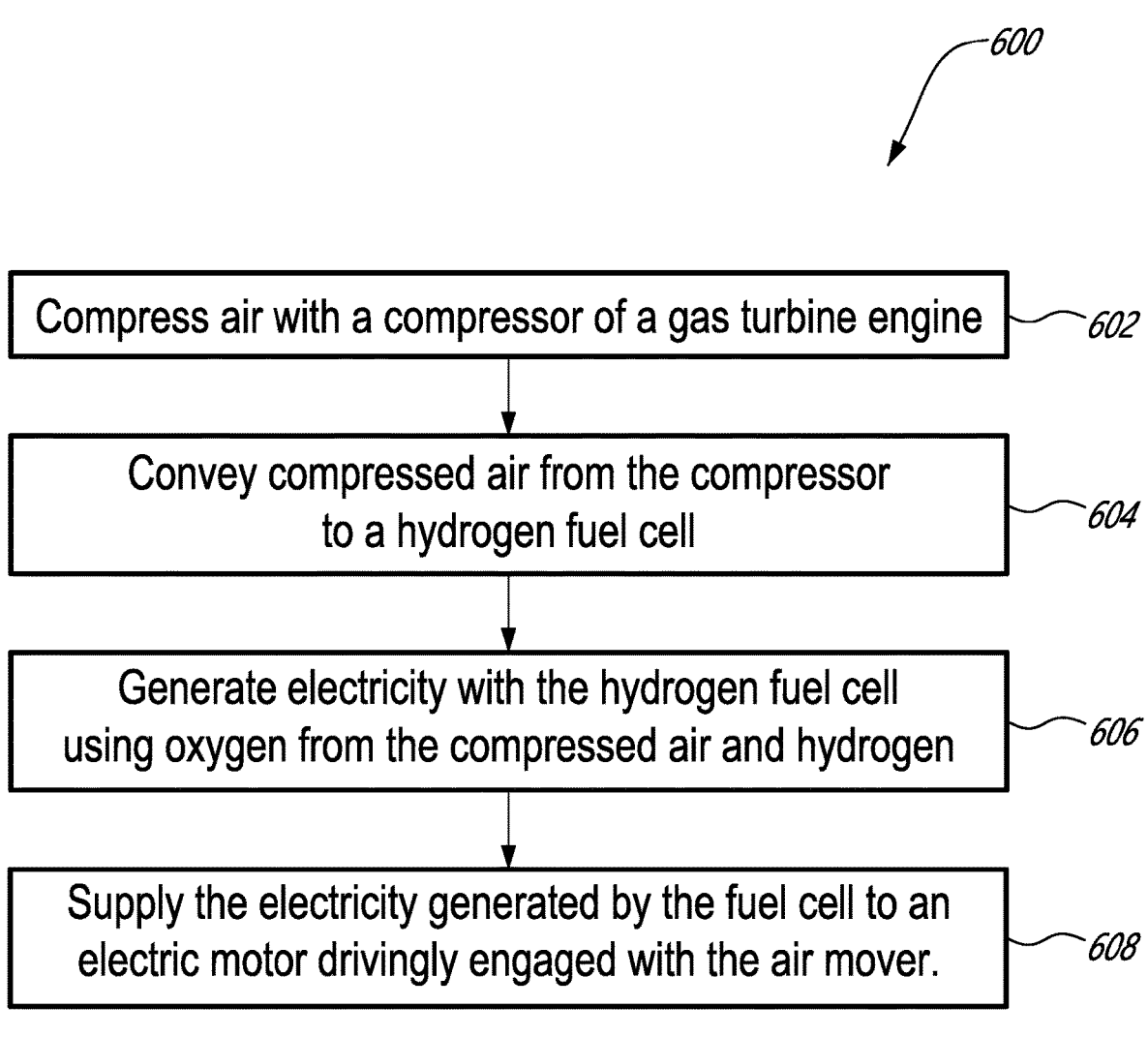
FIG. 6 is a flowchart illustrating steps of a method for driving an air mover for propelling an aircraft.

Referring now to FIG. 6, a method of driving the air mover 12 for propelling the aircraft is shown at 600. The method 600 includes operating the gas turbine engine 20 at 602; conveying compressed air extracted from the gas turbine engine 20 to the hydrogen fuel cell 13 at 604; generating electricity with the hydrogen fuel cell 13 using oxygen from the compressed air and hydrogen from the source of hydrogen 14 onboard the aircraft at 606; and supplying the electricity generated by the fuel cell 13 to the electric motor 11 drivingly engaged with the air mover 12 at 608. The electric motor 11 may be directly engaged to the air mover 12, or may be engaged to the air mover 12 via the gas turbine engine 20 as will be discussed below with reference to FIG. 5.

In the present embodiment, the operating of the gas turbine engine 20 at 602 may include generating thrust with the gas turbine engine 20. The thrust generated by the gas turbine engine 20 may be less than a thrust generated by the air mover 12. The operating of the gas turbine engine 20 at 602 may include supplying the combustor 22 of the gas turbine engine 20 with the hydrogen from the source of hydrogen 14 onboard the aircraft.

The generating of the electricity at 606 may include exhausting water, either in liquid or gaseous phase, from the fuel cell. The method 600 may include injecting the water in the gas turbine engine 20. The injecting of the water in the gas turbine engine 20 may include one or more of injecting the water at an inlet of the compressor 21 of the gas turbine engine 20, downstream of the inlet and upstream of an outlet of the compressor 21, and in the combustor 22 of the gas turbine engine 20 downstream of the compressor 21.

The method 600 may include transferring heat generated by the fuel cell 13 to a working fluid (e.g., coolant), and transferring the heat from the working fluid to ambient air. The transferring of the heat to the working fluid may include transferring the heat to air flowing within the air conduit 53.

The method 600 may include driving an air flow F1 within the air conduit 53 with exhaust gas exhausted by the gas turbine engine 20 and flowing through the ejector 54 located within the conduit 53.

In the embodiment shown, the method 600 may include starting the gas turbine engine 20 using a starter/generator connected to the gas turbine engine 20; and after the starting the gas turbine engine 20, generating electricity with the starter/generator driven by the gas turbine engine 20.

The disclosed aircraft power plants 10, 110, 210 may ensure that only a small amount of power is required at airports for operating different systems, such as avionics, cabin cooling or heating systems, and so on. This may be possible by starting the gas turbine engine 20 only when the aircraft is docked. This may reduce dependency on battery power, allowing for a smaller and lighter battery.

In some embodiments of aircraft power plants, pressurized air is generated without electrical cost for the fuel cell 13. More specifically, the compressed air may be obtained from a gas turbine engine or from a compressor driven by an internal combustion engine, which may not receive electrical power from the fuel cell 13. Hence, the power generated by the fuel cell 13 may be dedicated to propulsion by being entirely supplied to the electric motor 11 that drives the air mover 12. This may mitigate parasitic losses and improve efficiency.

In some embodiments, the disclosed power plants combining fuel cell and gas turbine engine may leverage advantages of these two systems since turbomachines can get more efficient with altitude. The combination of fuel cell with less parasitic load and an efficient turbomachine (with or without water/steam reinjection) may produce an overall lighter and more efficient system.

It is noted that various connections are set forth between elements in the preceding description and in the drawings. It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities. The term "connected" or "coupled to" may therefore include both direct coupling (in which two elements that are coupled to each other contact each other) and indirect coupling (in which at least one additional element is located between the two elements).

It is further noted that various method or process steps for embodiments of the present disclosure are described in the following description and drawings. The description may present the method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

Furthermore, no element, component, or method step in the present disclosure is intended to be dedicated to the public regardless of whether the element, component, or method step is explicitly recited in the claims. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various aspects of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these particular features may be described individually, it is within the scope of the present disclosure that some or all of these features may be combined with any one of the aspects and remain within the scope of the present disclosure. References to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. The use of the indefinite article "a" as used herein with reference to a particular element is intended to encompass "one or more" such elements, and similarly the use of the definite article "the" in reference to a particular element is not intended to exclude the possibility that multiple of such elements may be present.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. An aircraft power plant, comprising:
an air mover for propelling an aircraft;
an electric motor drivingly engaged with the air mover;

a gas turbine engine having a compressor for pressurizing air, a combustor in which the pressurised air is mixed with fuel and ignited for generating combustion gases, and a turbine for extracting energy from the combustion gases;
a hydrogen fuel cell operatively connected to the electric motor for powering the electric motor with electricity generated by the hydrogen fuel cell, the hydrogen fuel cell operable to generate electricity using the air from the compressor and hydrogen from a source of hydrogen;
a heat exchanger facilitating heat transfer from the hydrogen fuel cell to ambient air; and
an ejector driving the ambient air through the heat exchanger, the ejector being driven using combustion gas exhausted from the gas turbine engine.

2. The aircraft power plant of claim 1, comprising a conduit conveying water from the hydrogen fuel cell to the compressor of the gas turbine engine.

3. The aircraft power plant of claim 1, comprising a conduit conveying water from the hydrogen fuel cell to the combustor of the gas turbine engine.

4. The aircraft power plant of claim 1, comprising one or more of an evaporator facilitating evaporation of liquid water exiting the fuel cell, and a condenser facilitating condensation of gaseous water exiting the fuel cell.

5. The aircraft power plant of claim 1, wherein the gas turbine engine has a starter/generator drivingly engaged to the turbine, the starter/generator being operable as a motor and as generator.

6. The aircraft power plant of claim 1, wherein the air mover is devoid of mechanical engagement with the gas turbine engine.

7. The aircraft power plant as defined in claim 1, wherein:
the heat exchanger is disposed across a conduit; and
the ejector is disposed inside the conduit.

8. A method of driving an air mover for propelling an aircraft, the method comprising:
operating a gas turbine engine;
conveying compressed air extracted from the gas turbine engine to a hydrogen fuel cell;
generating electricity with the hydrogen fuel cell using oxygen from the compressed air and hydrogen from a source of hydrogen onboard the aircraft;
supplying the electricity generated by the hydrogen fuel cell to an electric motor drivingly engaged with the air mover;
facilitating heat transfer from the hydrogen fuel cell to ambient air outside of the gas turbine engine with a heat exchanger; and
driving the ambient air through the heat exchanger with an ejector driven using combustion gas exhausted from the gas turbine engine.

9. The method of claim 8, wherein operating the gas turbine engine includes generating thrust with the gas turbine engine, the thrust being less than a thrust generated by the air mover.

10. The method of claim 8, comprising:
starting the gas turbine engine using a starter/generator connected to the gas turbine engine; and
after the starting the gas turbine engine, generating electricity with the starter/generator driven by the gas turbine engine.

11. The method of claim 8, wherein the air mover is devoid of mechanical engagement with the gas turbine engine.

12. The method of claim 8, wherein the generating of the electricity includes exhausting water from the fuel cell, the method further comprising injecting the water in the gas turbine engine.

13. The method of claim 12, wherein the injecting of the water in the gas turbine engine includes one or more of injecting the water at an inlet of a compressor of the gas turbine engine, downstream of the inlet and upstream of an outlet of the compressor, and in a combustor of the gas turbine engine downstream of the compressor.

14. The method of claim 8, comprising transferring heat generated by the fuel cell to a working fluid, and transferring the heat from the working fluid to the ambient air.

15. The method of claim 14, wherein the transferring of the heat from the working fluid to the ambient air includes transferring the heat to the ambient air flowing within a conduit.

16. The method of claim 15, comprising driving a flow of the ambient air within the conduit with the combustion gas exhausted by the gas turbine engine and flowing through the ejector located within the conduit.

17. An aircraft power plant, comprising:

an electric motor drivingly engaged with a load;

a gas turbine engine;

a hydrogen fuel cell operatively connected to the electric motor for powering the electric motor with electricity generated by the hydrogen fuel cell, the hydrogen fuel cell operable to generate the electricity using compressed air extracted from the gas turbine engine and hydrogen from a source of hydrogen;

a heat exchanger facilitating heat transfer from the hydrogen fuel cell to ambient air outside of the gas turbine engine; and an ejector driving the ambient air through the heat exchanger, the ejector being driven using combustion gas exhausted from the gas turbine engine.

* * * * *